Aug. 20, 1929.  E. B. CARNS  1,725,440

LOCK WASHER

Filed April 6, 1927

Inventor,
Edmund B. Carns.
By his Attorney.
Ramsay Hoguet.

Patented Aug. 20, 1929.

1,725,440

UNITED STATES PATENT OFFICE.

EDMUND B. CARNS, OF NEW YORK, N. Y.

LOCK WASHER.

Application filed April 6, 1927. Serial No. 181,303.

My invention relates to improvements in lock washers such as are used to prevent a screw, bolt or the like from turning.

My invention is especially useful in connection with screws having slotted heads of the conventional kind although it can be used in connection with other types of screws or bolts, as will appear.

The invention is intended to produce an exceedingly cheap and simple lock washer which has means for holding it in place when a screw or the like is turned home against it and which has a plurality of outwardly extending or peripheral fingers or tongues which can be bent in to engage the slot of a screw head or other part of a screw or bolt, and which are numerous enough so that some of them may be certain of engaging a screw or the like in a manner to prevent it from turning.

The invention can be used to good advantage in certain parts of air craft construction, and for such use, the washer in its simplest form is suitable. For ordinary use, I prefer to have the washer provided with ears or lugs to engage locking parts of a structure to which it is applied by for some uses, for example, the application of a washer to the screws used in attaching the skin or cover of an air craft wing or the like, the lugs are not essential.

The structure and advantages will appear more fully from the the description which follows.

Reference is to be had to the accompanying drawings, in which similar reference characters represent corresponding parts in all views.

Figure 1:
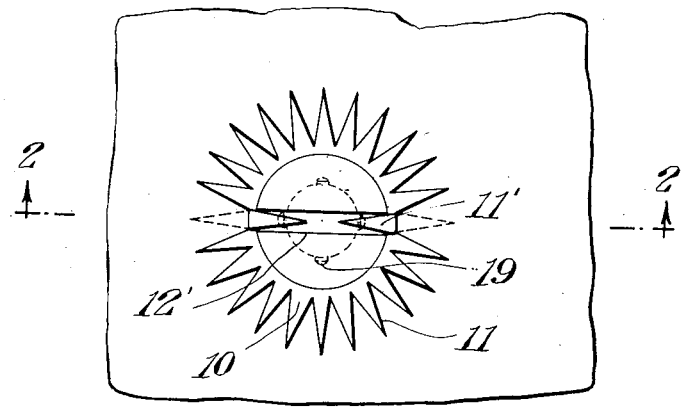
Figure 1 is a plan view of my improved lock washer as applied to the screw and connected parts.
Figure 2:
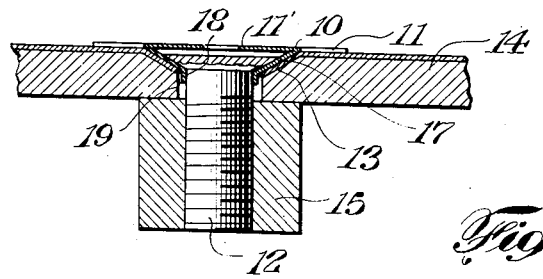
Figure 2 is a cross section on the line 2—2 of Figure 1.

The washer has a body 10 which can conveniently be stamped out of thin, soft readily bendable metal and it has many peripheral fingers or tongues 11, normally lying in the plane of the body but adapted to be folded inward, without injury, when desired.

This washer can be placed beneath the head of a screw 12 and I have shown it applied to a screw uniting the members 14 and 15, which, it will be understood, may be any parts to which the screw may be applied.

The washer has an opening or hole 16 through the middle through which a screw or bolt may pass and, in some forms, it is dished toward the center, as shown in 17 so that it may fit in a counter sink 13, usually provided for screws.

The washer can, also, have at its inner edge, lugs or ears 18 which should be parallel with the axis of the washer and the screws, and these lugs may be very small. They are somewhat exaggerated in the drawing for clearness. They can engage recesses 19 in the wall of the screw hole and the recesses, of course, can be small. All that is necessary is to have the washer catch sufficiently to prevent its turning.

It will be noticed that when the screw is turned home, the washer will be bound very securely between the screw head and the part 14 so that only a little additional resistance to the turning need be provided for.

When the screw is put through the washer and turned home, the washer will be held against turning as described and such tongues 11 as registered with the screw slot 12' can be turned or doubled over into engagement with the screw head, that is, can be made to enter the slot as shown in Figure 1 and thus the screw is locked against additional turning.

After the washer has been screwed down into position and the narrow metal tongues bent into the screw kerf, the structure is usually given a coating of varnish, lacquer or other protective substance. Due to the plurality of spaced metal tongues, the external edge of the washer has been greatly increased. The varnish or lacquer enters between the tongues and forms a cementing medium between the washer and cover. The result is that in order to move the washer it is necessary for the plurality of tongues to sheer the varnish or lacquer which has been placed over them and the cover to be held in place. Thus the washer is firmly cemented to the cover and the screw through the washer and cover is fixed in position due to the metal tongues which have been bent into the screw slot.

For purposes such as stated, the dishing effect 17 is desirable but even if the washer were flat, the pressure of the screw head would force it into the counter sink.

Figure 4:
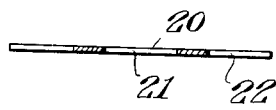
Figure 4 is a cross section of a slightly modified form of the washer.

In Figure 4, I have shown a modification in which the washer 20 is perfectly flat, has a screw hole through it and has tongues 22 like the tongues 11 already described.

For some purposes, this is all that is required, for example, where the screw and washer are used on surfaces which are to be varnished or covered with some siccative coating, the coating itself will, together with the screw pressure, hold the washer against turning.

Figure 5:
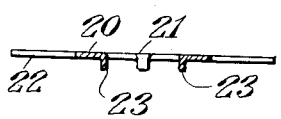
Figure 5 is a cross section showing another modification.
Figure 3:
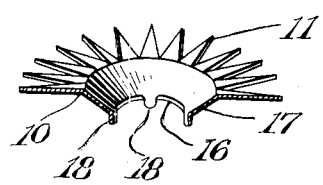
Figure 3 is a detail, partly in section and partly perspective, showing the details of the washer.

In Figure 5, I have shown the washer 20 having lugs 23 at the inner edge to engage corresponding recesses.

I have described the washer as having the tongues disposed to engage the slot 12' of a screw head but, obviously, it might be made to engage other parts of the head of the screw or bolt, and in referring to the structure as a screw lock, I use the name screw in its broad sense.

What I claim is:

1. An improved lock washer of soft sheet metal for use with screws, having a hole therethrough and a plurality of substantially spaced metal tongues disposed entirely around its outer periphery and lying normally in the plane of the washer body, but adapted to be bent into a screw slot.

2. An improved lock washer of soft sheet metal for use with screws, having lugs on its inner edge adapted to bend into the screw receiving hole, and substantially spaced peripheral tongues projecting from its outer edge, lying normally in a plane of the washer body and adapted to be bent into a screw slot.

In testimony whereof, I have signed my name to this specification this 4th day of April 1927.

EDMUND B. CARNS.